United States Patent
Arata et al.

(10) Patent No.: US 11,072,266 B2
(45) Date of Patent: Jul. 27, 2021

(54) VEHICLE SEAT

(71) Applicant: TACHI-S CO., LTD., Akishima (JP)

(72) Inventors: Kazuyoshi Arata, Tokyo (JP); Jun Takano, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 160 days.

(21) Appl. No.: 15/781,138

(22) PCT Filed: Dec. 9, 2016

(86) PCT No.: PCT/JP2016/086748
§ 371 (c)(1),
(2) Date: Jun. 3, 2018

(87) PCT Pub. No.: WO2017/110529
PCT Pub. Date: Jun. 29, 2017

(65) Prior Publication Data
US 2018/0354395 A1 Dec. 13, 2018

(30) Foreign Application Priority Data

Dec. 22, 2015 (JP) .............................. JP2015-249817
Mar. 4, 2016 (JP) .............................. JP2016-041784

(51) Int. Cl.
*B60N 2/56* (2006.01)
*A47C 7/74* (2006.01)

(52) U.S. Cl.
CPC .............. *B60N 2/5657* (2013.01); *A47C 7/74* (2013.01); *B60N 2/5642* (2013.01)

(58) Field of Classification Search
CPC ..... B60N 2/5642; B60N 2/565; B60N 2/5657
See application file for complete search history.

(56) References Cited

U.S. PATENT DOCUMENTS

| 5,597,200 A | * | 1/1997 | Gregory ................... A47C 7/74 |
| | | | 297/180.13 |
| 6,003,950 A | * | 12/1999 | Larsson ................... A47C 7/74 |
| | | | 297/452.42 |

(Continued)

FOREIGN PATENT DOCUMENTS

| CN | 105083082 A | 11/2015 | |
| DE | 10259621 A1 | * 7/2004 | ........... B60N 2/5657 |

(Continued)

OTHER PUBLICATIONS

International Search Report from International Patent Application No. PCT/JP2016/086748, dated Mar. 7, 2017.

(Continued)

*Primary Examiner* — Timothy J Brindley
(74) *Attorney, Agent, or Firm* — SGPatents PLLC

(57) ABSTRACT

A vehicle seat, wherein in order to ensure that air reliably flows through the entire sir channel formed on the seat obverse surface side when a blower on the seat reverse surface side is operated while an occupant is seated on the seat, a hole part passing from the surface on the side for seating the occupant through to the surface on the opposite side from the surface on the side for seating the occupant is formed through each urethane pad in a seat back and a seat cushion of the vehicle seat, the interiors of the hole parts formed in the urethane pads are filled with a material that is more breathable than the urethane pads, a plurality of grooves extending from the hole parts are formed on the surface of each of the urethane pads on the side for seating the occupant, and a blower for discharging or intaking air from the surface of each of the urethane pads on the side for seating the occupant through the hole parts filled with the breathable material is provided on the surface of each of the (Continued)

urethane pads on the side opposite the side for seating the occupant.

5 Claims, 14 Drawing Sheets

(56) References Cited

U.S. PATENT DOCUMENTS

| | | | |
|---|---|---|---|
| 6,062,641 A | 5/2000 | Suzuki et al. | |
| 10,556,526 B2 * | 2/2020 | Tait | B60N 2/5628 |
| 2002/0003362 A1 * | 1/2002 | Kunkel | B60N 2/5635 |
| | | | 297/180.14 |
| 2003/0214160 A1 * | 11/2003 | Brennan | B60N 2/5657 |
| | | | 297/180.14 |
| 2004/0104607 A1 | 6/2004 | Minegishi et al. | |
| 2005/0082885 A1 * | 4/2005 | Thunissen | B60N 2/56 |
| | | | 297/180.1 |
| 2015/0329029 A1 | 11/2015 | Akaike et al. | |
| 2017/0361742 A1 * | 12/2017 | Craig | B60N 2/5642 |
| 2018/0222364 A1 * | 8/2018 | Higashihara | B60N 2/70 |
| 2019/0118683 A1 * | 4/2019 | Kim | B60N 2/5875 |
| 2019/0298072 A1 * | 10/2019 | Bhatia | B60N 2/5642 |

FOREIGN PATENT DOCUMENTS

| | | | | |
|---|---|---|---|---|
| DE | 202018104915 U1 * | 9/2018 | | B60N 2/565 |
| EP | 1389558 A1 | 11/2012 | | |
| JP | 08-228889 A | 9/1996 | | |
| JP | 11-137371 A | 5/1999 | | |
| JP | 2012-228333 A | 2/2004 | | |
| JP | 2004-073429 A | 3/2004 | | |
| JP | 2012-115515 A | 6/2012 | | |
| JP | 2012-228333 A | 11/2012 | | |
| JP | 2014104051 A * | 6/2014 | | B60N 2/5642 |
| JP | 2015-223873 A | 12/2015 | | |
| JP | 2016112203 A * | 6/2016 | | A47C 27/14 |
| JP | 2016164028 A * | 9/2016 | | B60N 2/56 |
| WO | WO-2015163188 A1 * | 10/2015 | | A47C 27/122 |
| WO | WO-2016021225 A1 * | 2/2016 | | A47C 7/74 |

OTHER PUBLICATIONS

Office Action dated Dec. 24, 2019, in Chinese Patent Application No. 201680072668.

Office Action dated Aug. 21, 2020, in Chinese Patent Application No. 201680072668.

* cited by examiner

VEHICLE SEAT

TECHNICAL FIELD

The present invention relates to a vehicle seat for a passenger car and a truck.

BACKGROUND ART

Some of conventional vehicle seats have a configuration for reducing humidity and heat of the seat surface with air sent or drawn by a blower from a back surface of the seat to a side of the occupant seated on the seat.

For example, Japanese Unexamined Patent Publication No. 2004-73429 (Patent Literature 1) discloses an air permeable seat which has vent holes formed in a urethane pad of a seat body to communicate with a net-shaped cushion body provided on a seated part of the seat body. The net-shaped cushion body comprises three-dimensional net-shaped structures which are formed by a lot of continuous filament bodies each of which comprises a thermoplastic resin such as the thermoplastic elastomer resin and is bent in a loop shape and fused at portions of mutual contact.

Japanese Unexamined Patent Publication No. 2012-115515 (Patent Literature 2) discloses the air permeable seat which includes a urethane at a portion where the buttock of the seated occupant contacts the seat body, and a three-dimensional cushion body at a portion where the thigh of the occupant contacts. The three-dimensional cushion body comprises three-dimensional net-shaped structures formed by a lot of continuous filament bodies each of which comprises a thermoplastic resin and is bent in the loop shape and fused at portions of mutual contact.

CITATION LIST

Patent Literature

Patent Literature 1: Japanese Unexamined Patent Publication No. 2004-73429
Patent Literature 2: Japanese Unexamined Patent Publication No. 2012-11515

SUMMARY OF THE INVENTION

Technical Problem

Such a fiber pad as described in the Patent Literatures 1 and 2 are formed by continuous filament bodies comprising thermoplastic resin and has an excellent air permeability allowing the air to diffuse inside the pad.

However, a configuration described in the Patent Literature 1 couples the fiber pads and blowers with each other by means of the vent holes formed in the urethane pad, and the cross section of the vent holes is considerably small compared with the cross section of the fiber pads. Thus, the air sent out through the vent holes to the fiber pads flows to right above the vent holes and does not almost flow to portions apart in the radial direction of the vent holes. As a result, the effect of reducing humidity and heat of the seat surface is limited locally to portions right above the vent holes and the peripheral thereof.

In a configuration described in the Patent Literature 2, a relatively large portion where the occupant's thigh contacts is formed by a three-dimensional net-shaped cushion body including continuous filament bodies comprising a thermoplastic resin, but the blower for positively distributing the air via the three-dimensional net-shaped cushion body is not provided. Thus, a sufficient effect of reducing humidity and heat of the seat surface cannot be expected.

Also, the three-dimensional net-shaped cushion body is relatively soft and deformable compared with the urethane pad. Thus, when the occupant is seated on the three-dimensional net-shaped cushion body placed in a relatively large portion where the occupant's thigh contacts as described in the Patent Literature 2, the three-dimensional net-shaped cushion body deforms largely without supports of the peripheral thereof. This may result in deterioration of the occupant's seating comfort and deterioration of the air flow due to partial adhesion of the three-dimensional net-shaped cushion body.

For solving the above problems of conventional techniques, it is an object of the present invention to provide the vehicle seat which is configured such that when an occupant seated on the seat activates the blower on the back side of the seat, the air flows across entire the air passages formed on the surface of the seat in a reliable manner.

Solution to Problem

For solving the above problems, an aspect of the present invention provides the vehicle seat which includes a seat cushion, a seat back, and a head rest, the vehicle seat having the following configuration. The seat cushion and the seat back include the urethane pad respectively. Each of the urethane pads has holes extending from a surface of the seat where the occupant is seated to the surface on the surface opposite to the surface where the occupant is seated. The holes formed in each urethane pad are filled with a material having the air permeability higher than the urethane pad. A plurality of grooves extending from the holes are formed on the surface of each urethane pad where the occupant is seated. The blowers are provided on the surface opposite to the surface of the urethane pad where the occupant is seated to discharge or draw in the air from the surface of each urethane pad on the side where the occupant is seated, via the holes filled with the permeable material.

For solving the above problems, an another aspect of the present invention provides the vehicle seat which includes the seat cushion, the seat back, and the head rest, the vehicle seat having the following configuration. The seat cushion and the seat back include the urethane pad respectively. At least one of the urethane pads of the seat cushion and the seat back has the holes extending from the surface of the seat where the occupant is seated to the surface opposite to the surface where the occupant is seated. The holes formed in each urethane pad are filled with the material having the air permeability higher than the urethane pad. The Grooves having openings on the surface where the occupant is seated and extending from the holes are formed on the surface of the urethane pad where the occupant is seated. In the cross section of the groove at a right angle relative to a direction where the groove extends from the hole, width dimension of the groove inside the urethane pad is larger than width dimension of the opening. The blowers are provided on the surface opposite to the surface of the urethane pad where the occupant is seated.

Further, for solving the above problems, still another aspect of the present invention provides the vehicle seat which includes the seat cushion, the seat back, and the head rest, the vehicle seat having the following configuration. The seat cushion and the seat back include the urethane pad respectively. At least one of the urethane pads partially includes the material having the air permeability higher than the urethane pad. The material has a lot of slits extending from the surface of the urethane pad where the occupant is seated to the surface opposite to the surface where the occupant is seated.

Further, for solving the above problems, a still another aspect of the present invention provides the vehicle seat which includes the seat cushion, the seat back, and the head rest, the vehicle seat having the following configuration. The seat cushion and the seat back include the urethane pad respectively. At least one urethane pad of the seat cushion and the seat back has a lot of slits extending from the surface where the occupant is seated to the surface opposite to the surface where the occupant is seated. The blowers are provided on the surface of the formed plurality of slits opposite to the surface where the occupant is seated.

Advantageous Effects of Invention

An aspect of the present invention allows the air to flow across the air passages formed on the seat surface when the occupant seated on the seat activates the blowers on the back surface of the seat.

DESCRIPTION OF EMBODIMENTS

According to an aspect of the present invention, the vehicle seat includes the fiber pads provided in place of the urethane pad at portions where the vehicle seat contacts the thigh and the back of the occupant, and the grooves provided at the peripheral of the fiber pads such that when the occupant seated on the seat activates the blowers on the back surface of the seat, the air flows across entire the air passages formed on the seat surface in a reliable manner.

Further, according to another aspect of the present invention, the vehicle seat includes a lot of slits formed on the urethane pad or the fiber pad partially provided on the urethane pad at portions where the vehicle seat contacts the thigh and the back of the seated occupant, the slits extending through from a surface side to a back side. The slits are configured to open wide when the occupant is seated on the seat such that when the blowers on the back surface of the seat are activated, the air flows across entire the air passages formed on the seat surface in the reliable manner.

Hereinafter, embodiments according to the present invention are described with reference to the accompanying drawings.

Figure 1:
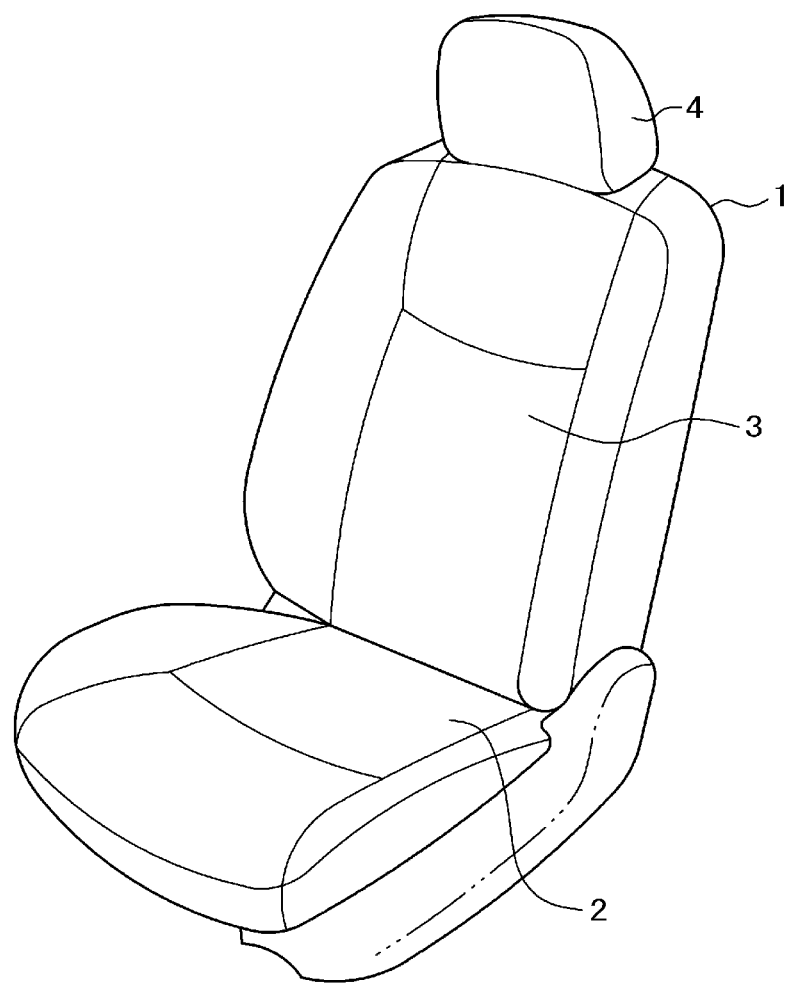
FIG. 1 is a perspective view illustrating an appearance of the vehicle seat according to embodiments of the present invention.

FIG. 1 illustrates a basic configuration of a vehicle seat 1 applicable to all aspects of the present invention. The vehicle seat 1 includes a seat cushion 2 on which the occupant is seated, a seat back 3 on which the back of the occupant seated on the seat cushion rests, and a head rest 4 which supports the head of the occupant.

Figure 2:
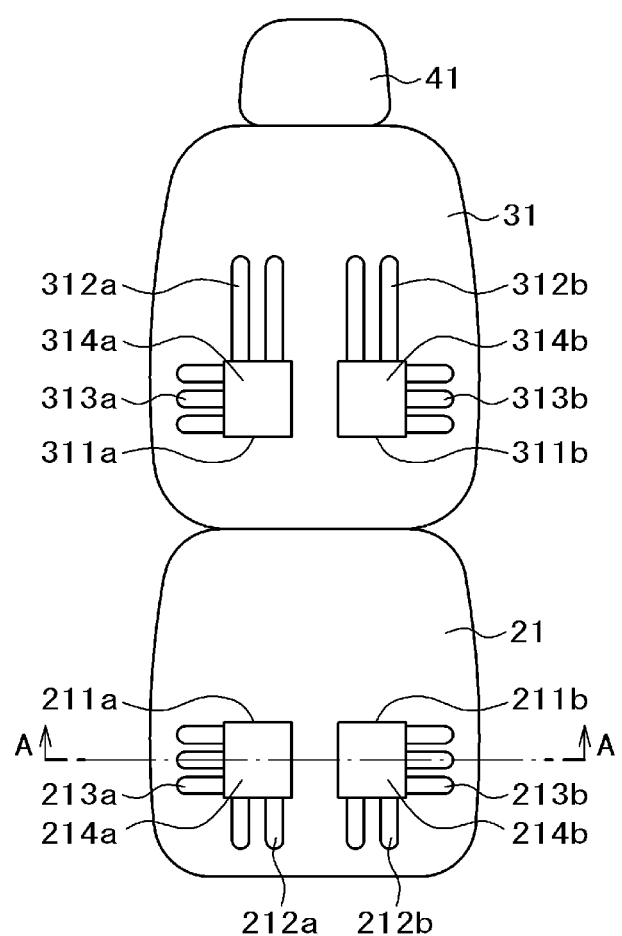
FIG. 2 is a plan view of the vehicle seat with a trim cover covering the vehicle surface removed and the seat back tilted according to a first embodiment of the present invention.

FIG. 2 is a plan view of the vehicle seat 1 illustrated in FIG. 1 with the trim cover covering the surface of the vehicle seat 1 removed to expose the urethane pad, and the seat back 3 tilted.

The urethane pad 21 on the side of the seat cushion 2 has relatively large holes 211a and 211b which contact the thigh of the seated occupant. The internal sections of the holes 211a and 211b are filled with auxiliary pad members (fiber pads) formed by entangling fibers in a net shape.

The holes 211a and 211b filled with the fiber pads 214a, 214b have the grooves 212a, 212b extending in a front direction (direction of the knee) of the seated occupant and the grooves 213a, 213b extending in a lateral direction (on the outside) of the seated occupant. The internal sections of the grooves 212a, 212b, and the grooves 213a, 213b are not filled with the fiber pads 214a, 214b and have a cavity respectively.

On the other hand, the urethane pad 31 on the side of the seat cushion 3 has relatively the large holes 311a and 311b formed at portions where the back of the seated occupant contacts. The internal sections of the holes 311a and 311b are filled with auxiliary pad members 314a, 314b (fiber pads) formed by entangling fibers in the net shape.

The grooves 312a, 312b are formed by extending in an upward direction of the back of the seated occupant from the hole 311a filled with the fiber pads 314a, 314b, and the grooves 313a, 313b are formed by extending in the lateral direction (to the outside) of the seated occupant from the holes 311a, 311b filled with the fiber pads 314. The internal sections of the grooves 312a, 312b, and the grooves 313a, 313b are not filled with the fiber pads 314a, 414b and have a cavity respectively.

Figure 3A:
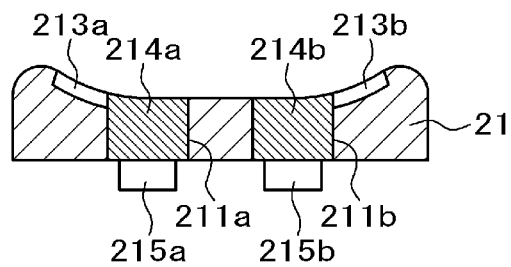
FIG. 3A is a cross section taken along the line A-A in FIG. 2 of the vehicle seat according to the first embodiment of the present invention.

FIG. 3A illustrates a cross section taken along the line A-A in the urethane pad 21 on the side of the seat cushion 2 in FIG. 2. The holes 211a and 211b are formed by extending through the urethane pad 21. The blowers 215a, 215b are provided respectively at portions corresponding to the holes 211a and 211b on the back surface (at the lower side of FIG. 3A) of the urethane pad 21. In FIG. 3A, members coupling the blowers 215a, 215b and the urethane pad 21 with each other are not shown. As the blowers 215a, 215b, for example, sirocco fans are used.

In the configuration illustrated in FIG. 3A, the internal sections of the holes 221a, 211b are filled with the fiber pads 214a, 214b respectively. An upper surface (at the upper side of FIG. 3A) of the urethane pad 21 where the occupant is seated has the groove 213a formed by extending outward from the hole 211a, and the groove 213b formed by extending outward from the hole 211b.

With such a configuration on the side of the seat cushion 2, when activating the blowers 215a and 215b in a state that the occupant seated, the blowers 215a and 215b draw in the air from the side of the fiber pads 214a and 214b where the occupant is seated and discharge from the back surface (at the lower side of FIG. 3A) of the urethane pad 21 to the outside. In this operation, the air is also drawn in from the grooves 212a, 212b and the grooves 213a, 213b, and then the air is drawn in from the bottom of the thigh of the occupant seated on the seat cushion 2 and from a relatively wide area in the peripheral thereof.

With such a configuration where the air is drawn in from below the thigh of the occupant seated on the seat cushion 2 and from a relatively wide area in the peripheral thereof, humidity and heat in a relatively wide area of the seat surface may be reduced compared with the air intake only from the holes 211a and 211b, and thereby comfortability of the occupant may be increased. Since the air is drawn in from a relatively wide area, comfortability may be maintained for a relatively long time compared with conventional configurations even when the occupant is seated continuously for a long time.

Although the area illustrated in FIG. 2 has the grooves 212a, 212b which are formed by extending in the front direction of the seated passenger from the holes 211a and 211b filled with the fiber pads 214a, 214b, and the grooves 213a, 213b which are formed by extending in the lateral direction (to the outside) of the seated passenger, the area may further have the grooves which are formed by extending from the holes 211a and 211b toward the rear side (at the side of buttock) of the seated passenger and the grooves which are formed by extending from the holes 211a and 211b inward to the seated occupant.

In the configuration illustrated in FIG. 3A, a configuration having the blowers 215a and 215 attached correspondingly to the holes 211a and 211b is described. However, the blowers may be shared. In this case, a duct is attached between one blower and the holes 211a and 211b to discharge the air by the blower from the holes 211a and 211b via the duct.

Figure 3B:
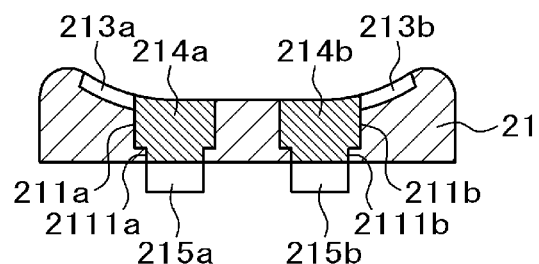
FIG. 3B is a cross section taken along the line A-A in FIG. 2 of a modified example of the vehicle seat according to the first embodiment of the present invention.

Although the holes 211a and 211b illustrated as an example are formed in the same shape continuous from a side of the urethane pad 21 of the seat cushion 2 where the occupant is seated to a side thereof where the blowers 215a, 216a are attached, the shape may be formed such that cross section of the holes at portions 2111a, 2111b where the blowers 215a, 215b are attached is smaller than upper portions as illustrated in FIG. 3B. The cross section shape of the holes 211a and 211b shaped in such a manner may prevent the fiber pads 214a, 214b filled into the holes 211a and 211b from displacing to below the holes 211a and 211b which are toward the side of the blowers 215a, 215b.

Figure 3C:
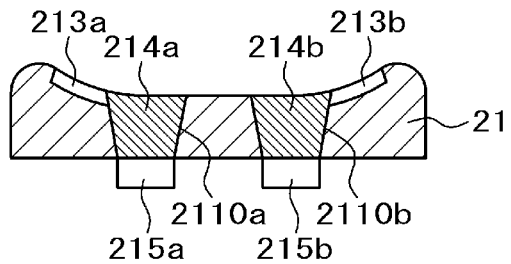
FIG. 3C is a cross section taken along the line A-A in FIG. 2 of another modified example of the vehicle seat according to the first embodiment of the present invention.

Further, in place of the shape of the holes 211a, 211b illustrated in FIG. 3A, the holes 2110a, 2110b may have a tapered cross section such that diameter of the cross section on the side where the blowers 215a, 215b are attached is smaller than diameter of the cross section on the side of the urethane pad 21 where the occupant is seated, as illustrated in FIG. 3C. The cross section of the holes 211a and 211b shaped in such a manner may prevent the fiber pads 214a, 214b filled into the holes 211a and 211b from displacing to below the holes 2110a and 2110b which is toward the side of the blowers 215a, 215b. The same configuration as in FIG. 3C may be also applied to the urethane pad 31 on the side of the seat back 3.

Although FIG. 3A to FIG. 3C illustrate the configuration of the urethane pad 21 on the side of the seat cushion 2, the urethane pad 31 on the side of the seat back 3 has a similar cross section configuration, where the holes 311a and 311b are formed by extending through the urethane pad 31, and the internal sections thereof are filled with the fiber pads 314a and 314b. In the same manner as illustrated in FIG. 3A to FIG. 3C, the blowers (not shown) are attached to the back surface (surface opposite to the surface where the back of the occupant rests) of the holes 311a and 311b of the urethane pad 31.

With such a configuration on the side of the seat back 3, when the occupant seated with the back resting on the seat back 3 activates the blowers attached to the back surface of the holes 311a and 311b, the blowers draw in the air from the side of the fiber pads 314a and 314b where the occupant is seated and discharge from the back surface of the urethane pad 31 to the outside. In this operation, the air is also drawn in from the grooves 312a, 312b and the grooves 313a, 313b, and then the air is drawn in from a portion where the back of the occupant seated on the seat back 3 contacts and a relatively wide area in the peripheral thereof.

Although the configuration illustrated in FIG. 2 has the grooves 312a, 312b formed by extending upward to the seated occupant from the holes 311a and 311b filled with the fiber pads 314a, 314b, and the grooves 313a, 313b formed by extending in the lateral direction (outward) to the seated occupant, the configuration may further have the grooves formed by extending from the holes 311a and 311b downward to the seated occupant and the grooves formed by extending from the holes 311a and 311b inward to the seated occupant.

Configurations described with reference to FIG. 3B and FIG. 3C may be also applied to the urethane pad 31 on the side of the seat back 3 in the same manner.

Although examples of filling the holes 211a and 211b with the fiber pads 214a, 214b are described, the material having the air permeability higher than urethane pads 21 and 31 such as, for example, a permeable material formed by forming a lot of the small holes on the urethane pad, a 3D mesh, an Airweave (registered trade mark) and a Breathair (registered trade mark) may be used in place of the fiber pads 214a, 214b. The same also applies to the material filled into the holes 311a and 311b.

With such a configuration where the air is drawn in from the back of the occupant rested on the seat back 3 and from a relatively wide area in the peripheral thereof, humidity and heat in a relatively wide area of the seat surface may be reduced compared with the air intake only from the holes 211a and 211b, and thereby comfortability of the occupant may be increased. Since the air is drawn in from a relatively wide area, comfortability may be maintained for a relatively long time compared with conventional configurations even when the occupant is seated continuously for a long time.

In the above embodiment, the air intake by the blowers from a portion where the back of the occupant seated on the seat back 3 contacts and from a relatively wide area in the peripheral thereof is described. However, on the contrary to this, the air may be blown out from the blowers to a portion where the back of the occupant seated on the seat back 3 contacts and a relatively wide area in the peripheral thereof.

In the above embodiment, examples of filling the holes 211a, 211b, and the holes 311a, 311b on both of the seat cushion 2 and the seat back 3 with the fiber pads 214a, 214b, and the fiber pads 314a, 314b are described. However, this may be applied only to any one of the seat cushion 2 and the seat back 3.

Second Embodiment

Figure 4:
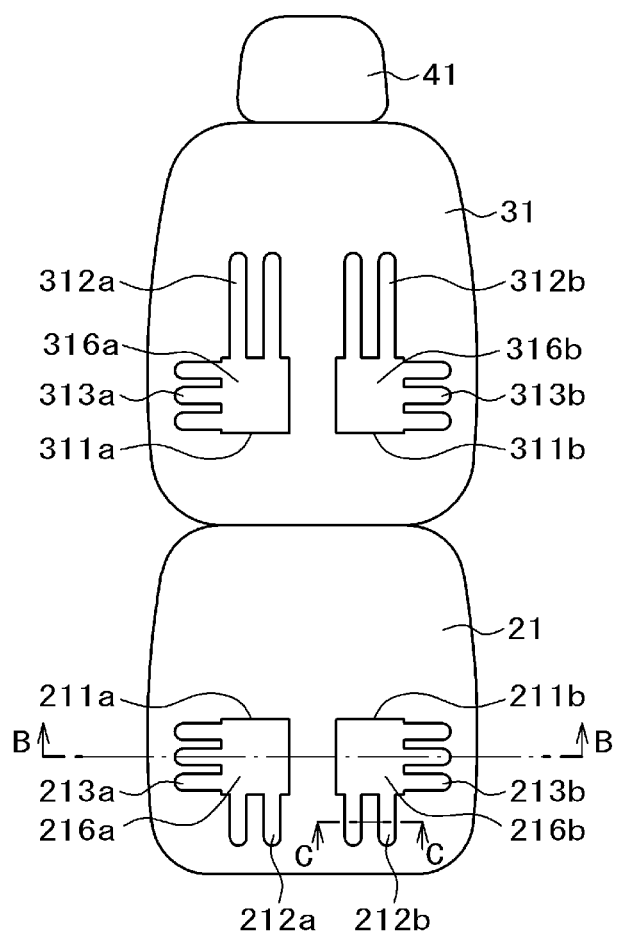
FIG. 4 is a plan view of a vehicle seat with the trim cover covering the surface of the vehicle seat removed and the seat back tilted according to a second embodiment of the present invention.

A second embodiment of the present invention is described with reference to FIG. 4 and FIG. 5. FIG. 4 is a plan view of the vehicle seat 1 illustrated in FIG. 1 with the trim cover covering the surface of the vehicle seat 1 removed and the urethane pad exposed to tilt the seat back 3.

The second embodiment is different from the first embodiment in that the internal sections of the grooves 212a, 212b and the grooves 213a, 213b formed on the seat cushion 21 are also filled with the fiber pads 16a, 216b, and the internal sections of the grooves 312a, 312b and the grooves 313a, 313b formed on the urethane pad 31 on the side of the seat back 3 are also filled with the fiber pads 316a, 316b.

Description of components same as those in the first embodiment is omitted for avoiding duplication.

Figure 5:
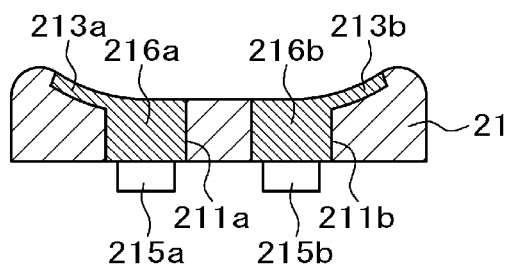
FIG. 5 is a cross section taken along the line B-B in FIG. 4 of the vehicle seat according to the second embodiment of the present invention.

FIG. 5 illustrates a cross section taken along the line B-B of FIG. 4. In the same manner as in the first embodiment, the holes 211a and 211b are formed by extending through the urethane pad 21. The blowers 215a, 215b are provided respectively at portions corresponding to the holes 211a and 211b on the back surface (at the lower side of FIG. 3A) of the urethane pad 21. In FIG. 3A, members connecting the blowers 215a, 215b and the urethane pad 21 are not shown.

In the configuration illustrated in FIG. 5, the internal sections of the holes 211a and 211b are filled respectively with the fiber pads 216a, 216b. An upper side (upper side of FIG. 5) of the urethane pad 21 where the occupant is seated has the groove 213a formed by extending outward from the hole 211a, and the groove 213b formed by extending outward from the hole 211b.

With such a configuration on the side of the seat cushion 2, when the seated occupant activates the blowers 215a and 215b, the blowers 215a and 215b draw in the air from the side of the fiber pads 216a and 216b where the occupant is seated and discharge from the back surface (lower side of FIG. 5) of the urethane pad 21 to the outside. In this operation, the air is also drawn in from the grooves 212a, 212b and the grooves 213a, 213b, and then the air is drawn in from below the thigh of the occupant seated on the seat cushion 2 and from a relatively wide area in the peripheral thereof.

With such a configuration where the air is drawn in from below the thigh of the occupant seated on the seat cushion 2 and from a relatively wide area in the peripheral thereof, humidity and heat in a relatively wide area of the seat surface may be reduced, and thereby comfortability of the occupant may be increased. Since the air is drawn in from a relatively wide area, comfortability may be maintained for a relatively long time compared with conventional configurations even when the occupant is seated continuously for a long time.

Although FIG. 5 illustrates the configuration of the urethane pad 21 on the side of the seat cushion 2, the urethane pad 31 on the side of the seat back 3 also has a similar cross section. More specifically, the holes 311a and 311b are formed in the urethane pad 31 by extending through the urethane pad 31. The internal sections of the hole 311a and the grooves 312a, 313b extending therefrom and the internal sections of the hole 311b and the grooves 312b, 313b extending therefrom are filled with the fiber pads 316a and 316b. In the same manner as illustrated in FIG. 5, the blowers (not shown) are attached to the back surface (opposite to a side where the back of the occupant rests) of the holes 311a and 311b of the urethane pad 31.

With such a configuration of the seat back 3, when the occupant seated with the back resting on the seat back activates the blowers attached to the back surface of the holes 311a and 311b, the blowers draw in the air from the side of the fiber pads 316a and 316b where the occupant is seated and discharge the air from the back surface of the urethane pad 31. Consequently, the air is drawn in from the portion of the seat back 3 where the back of the seated occupant contacts and from a relatively wide area in the peripheral thereof.

With such a configuration where the air is drawn in from the back of the seated occupant resting on the seat back 3 and from a relatively wide area in the peripheral thereof, humidity and heat in a relatively wide area of the seat surface may be reduced compared with the air intake only from the holes 311*a* and 311*b*, and thereby comfortability of the occupant may be increased. Since the air is drawn in from a relatively wide area, comfortability may be maintained for a relatively long time compared with conventional configurations even when the occupant is seated continuously for a long time.

In the above embodiment, the air intake by the blowers from a portion where the back of the occupant seated on the seat back 3 contacts and from a relatively wide area in the peripheral thereof is described. However, on the contrary to this, the air may be blown out from the blowers to a portion where the back of the occupant seated on the seat back 3 contacts and from a relatively wide area in the peripheral thereof.

In the above embodiment, examples of filling the holes 211*a*, 211*b*, and the holes 311*a*, 3161 and the grooves on both of the seat cushion 2 and the seat back 3 with the fiber pads 216*a*, 216*b*, and the fiber pads 316*a*, 316*b* are described. However, this may be applied only to any one of the seat cushion 2 and the seat back 3.

Further, in the configuration illustrated in FIG. 5, a configuration having the blowers 215*a* and 215*b* attached correspondingly to the holes 211*a* and 211*b* is described. However, the blowers may be shared. In this case, a duct is attached between one blower and the holes 211*a* and 211*b* to discharge the air by the blower from the holes 211*a* and 211*b* via the duct.

Third Embodiment

A third embodiment of the present invention is described with reference to FIG. 7 and FIG. 9.

Figure 6:
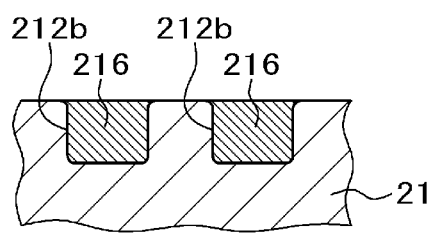
FIG. 6 is a cross section of the vehicle seat corresponding to the cross section taken along the line C-C of FIG. 4 according to the first embodiment of the present invention.

In the second embodiment, the grooves 212*a*, 212*b*, 213*a*, 213*b*, and the grooves 312*a*, 312*b*, 313*a*, 31*b* formed on the urethane pad 21 on the side of the seat cushion 2 illustrated in FIG. 4 have the same cross section shape in the cross section at a right angle relative to the longitudinal direction of the grooves. As an example, FIG. 6 illustrates a cross section shape of the groove 212*b*. The groove 212*b* has a rectangular cross section shape.

The groove of such a rectangular cross section shape may cause the occupant seated on the seat cushion 2 to feel a recess of the grooves and subsequent deterioration of seating comfort.

For solving the problem, in this embodiment, the grooves on the side where the occupant is seated are formed such that the dimension of the opening thereof is smaller than the dimension of the lower section. More specifically, in order to prevent deterioration of seating comfort of the seated occupant due to the recess of the grooves, the opening dimension of the opening of the grooves under no load is set to a dimension not causing the occupant seated on the seat cushion 2 to feel the recess of the grooves.

Figure 7:
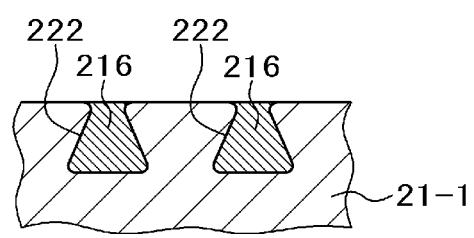
FIG. 7 is a cross section taken along the line C-C in FIG. 4 of the vehicle seat according to a third embodiment of the present invention.

FIG. 7 illustrates the groove 222 having the cross section of a substantially trapezoidal shape. In FIG. 7, the groove 222 formed on the urethane pad 21-1 has the substantially trapezoidal shape with a bottom surface larger than an opening on the upper side. The groove 222 has the cross section shape narrower than an internal space of the groove 222 with the opening formed inside the urethane pad 21-1. The internal space of the groove 222A is filled with the fiber pad 216.

When the occupant is seated on the seat cushion 2, the flexible urethane pad 21-2 compressed by the weight of the occupant deforms and subsequently, the groove 222 also deforms. The groove 222 has a shape with the upper section (opening) narrower than the bottom section and is formed such that thickness in the cross section gradually decreases toward the upper section. Thus, when the weight of the occupant is applied, the groove 222 is largely deformable in a direction where width of the opening becomes narrower, and thereby reduces dimension of the opening. In the meantime, the dimension of the bottom section of the groove 222 does not almost change from a dimension before the occupant is seated. As a result, the space of the air passage may be secured in the groove 222 even when the load is applied, and thereby the air may be supplied to and discharged from a distal end part of the groove 222.

On the other hand, when the weight of the occupant is applied, the opening of the groove 222 deforms in a direction where the opening dimension (width) becomes smaller. However, the opening dimension of the opening under no load may be set such that the opening dimension of the deformed opening does not cause the seated occupant to feel the recess, and thereby deterioration of the seating comfort for the seated occupant due to the recess may be prevented.

Figure 8:
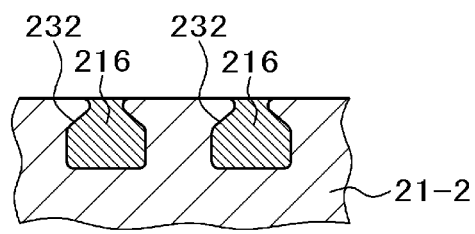
FIG. 8 illustrates a modified example of the cross section taken along the line C-C in FIG. 4 of the vehicle seat according to the third embodiment of the present invention.

FIG. 8 illustrates an example of the groove 222 having the cross section shape modified from FIG. 7. The cross section shape of the groove 232 formed on the urethane pad 21-2 illustrated in FIG. 8 includes an opening formed at a center of an upper section of a rectangular space as a result that thickness gradually decreases from both sides. More specifically, the opening formed at the upper section of the groove 232 includes the cross section shape narrower than a space portion of the groove 232 formed inside the urethane pad 21-2. When the occupant is seated on the seat cushion 2, the groove 232 of such shape deforms largely in the direction where width of the opening formed at the upper section of the groove 232 becomes narrower, while dimension of the bottom section of the groove 232 does not almost change compared with a non-load state where the occupant is not seated. As a result, the space of the air passage may be secured in the groove 232 even when the occupant is seated, and thereby the air may be supplied to and discharged from the distal end part of the groove 232. The internal space of the groove 232 is filled with the fiber pad 216.

When weight is applied, the opening formed at the upper section of the groove 232 deforms in the direction where the opening dimension (width) becomes smaller. However, the opening dimension of the opening under no load may be set such that the opening dimension of the deformed opening does not cause the seated occupant to feel the recess, and thereby deterioration of the seating comfort for the seated occupant due to the recess may be prevented.

Figure 9:
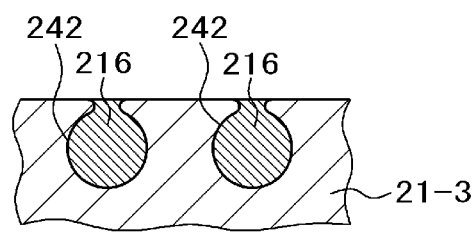
FIG. 9 illustrates another modified example of the cross section taken along the line C-C in FIG. 4 of the vehicle seat according to the third embodiment of the present invention.

FIG. 9 illustrates an example of the groove 222 having the cross section shape modified from FIG. 7. The cross section shape of the groove 242 illustrated in FIG. 9 includes an opening formed at a center of the upper portion of the circular cross section as a result that thickness gradually decreases from both sides. More specifically, the groove 242 has the cross section shape in which the opening formed at the upper section is narrower than a largest internal space of the groove 242 inside the urethane pad 21-1.

When the occupant is seated on the seat cushion 2, the groove 242 illustrated in FIG. 9 also deforms largely in a direction where width of the opening becomes narrower, while dimension of the bottom section of the groove 242 does not almost change compared with the non-load state where the occupant is not seated on the seat cushion 2. As a result, the space of the air passage may be secured in the groove 242 even when the load is applied with the occupant seated on the seat cushion 2, and thereby the air may be supplied to or discharged from the tip portion of the groove 242. The internal space of the groove 242A is filled with the fiber pad 216.

When weight is applied, the opening of the groove 242 deforms in the direction where the opening dimension (width) becomes smaller. However, the opening dimension of the opening under no load may be set such that the opening dimension of the deformed opening does not cause the seated occupant to feel the recess, and thereby deterioration of the seating comfort for the seated occupant due to the recess may be prevented.

According to this embodiment, for example, in the configuration illustrated in FIG. 7, the cross section of the groove 222 formed on the urethane pad 21-1 is shaped such that thickness of the cross section of the opening provided at the upper section of the groove 222 on the side where the occupant is seated gradually decreases from the outer side toward the center of the opening. This allows the air to be drawn in from the bottom of the thigh of the occupant seated on the seat 2 and from a relatively wide area in the peripheral thereof. Such configuration may reduce humidity and heat in a relatively wide area of the seat surface and thereby increase comfortability of the occupant. Since the air is drawn in from the relatively wide area, comfortability may be maintained for the relatively long time compared with conventional configurations even when the occupant is seated continuously for a long time.

Extent of deformation of the grooves 222, 232, 242 depends on the load or weight or seated position of the seated occupant. At the portion where a big load is applied, the grooves 222, 232, 242 deform largely and reduce width thereof. At the portion where a small load is applied, the grooves 222, 232, 242 deform slightly and do not so much reduce the opening dimension of the opening thereof. This causes a distribution of the air amount blown or drawn in through respective openings. As a result, the portion where a big load is applied has less amount of the air blown out or drawn in through the openings, while the portion where a load is relatively small has larger amount of the air blown out or drawn in through the openings.

Thus, increase of the air blown out or drawn in through openings at the portion where the load is small increases sensation of coolness of the seated occupant and improves physical feeling.

Also, the air passage is secured as described above even at the portion where cross sections of the grooves 222, 232, or 242 deform largely due to the big load applied. Thus, the air sent from the blower 215a or 215b may be passed across the grooves 222, 232, or 242 without a significant resistance. Also, the air drawn in by the blower 215a or 215b from the grooves 222, 232, 242 may be drawn in without the significant resistance. Therefore, even if axial fans are used as the blowers 215a and 215b in place of sirocco fans, sufficient the air quantity may be secured across the grooves 222, 222, or 242.

In this embodiment, the internal spaces of the grooves 222, 232, or 242 are filled with the fiber pad 216 in the same manner as the second embodiment. However, as described in the first embodiment, this embodiment may be also applied to a case where the internal spaces of the grooves 222, 232, or 242 are not filled with the fiber pad 216.

Fourth Embodiment

Figure 10A:
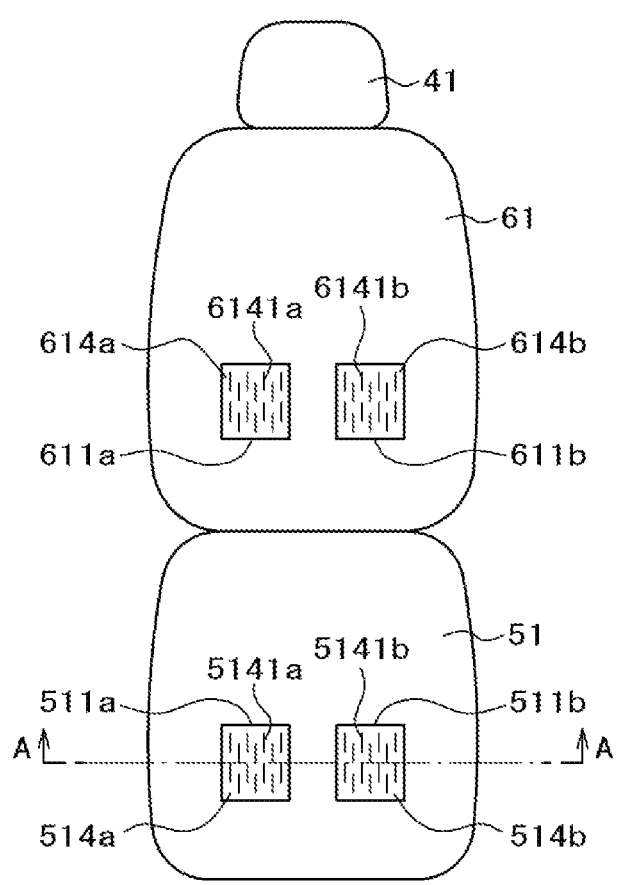
FIG. 10A is a plan view of the vehicle sheet with the trim cover covering the surface of the vehicle seat removed and the seat back tilted according to a fourth embodiment of the present invention.

FIG. 10A is a plan view of the vehicle seat illustrated in FIG. 1 with the trim cover covering the surface of the vehicle seat removed to expose the urethane pad, and the seat back 3 tilted.

The urethane pad 51 on the side of the seat cushion 2 includes the fiber pads 514a, 514b which are integrally formed into the urethane 51 at areas 511a and 511b where the thigh of the seated occupant contacts. The fiber pads 514a, 514b are auxiliary pad members (fiber pads) of fibers entangled in a net shape, and are integrated into the urethane pad 51 by molding (integral molding) when foam-molding the urethane pad 51.

Also, slits 5141a, 5141b are formed in the fiber pads 514a, 514b. Each of slits 5141a and 5141b includes a lot of slits formed in an alternate manner. Slits 5141a and 5141b are respectively formed by extending through from surfaces of the fiber pads 514, 514b to back surfaces thereof.

The slits 5141a and 5141b may be formed in the fiber pads 514a, 514b before being integrally molded into the urethane pad, or may be formed in the fiber pads 514a, 514b after having been molded into the urethane pad.

On the other hand, the urethane pad 61 on the side of the seat back 3 includes relatively wide areas 611a and 611b formed at portions where the back of the seated occupant contacts. Areas 611a and 611b include auxiliary pad members (fiber pads) 614a, 614b formed by entangling fibers molded (integral molding) in the net shape when foam-molding the urethane pad 61. For this reason, the fiber pads 614a, 614b are integrated into the urethane pad 61.

Slits 61a, 61b are formed in the fiber pads 614a, 614b. Each of slits 6141a and 614b includes a lot of slits formed in an alternate manner. Slits 6141a and 6141b are respectively formed by extending through from surfaces of the fiber pads 614a, 614b to back surfaces thereof.

Figure 10B:
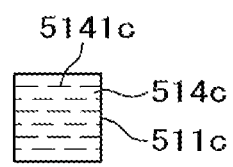
FIG. 10B is an enlarged view of an area 511a and a peripheral thereof indicating a state that slits are formed in a horizontal direction in the area 511a in FIG. 10A of the vehicle seat according to the fourth embodiment of the present invention.
Figure 10C:
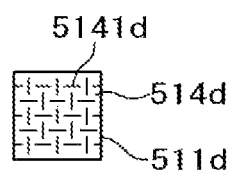
FIG. 10C is an enlarged view of the area 511a and the peripheral thereof indicating a state that net-shaped slits are formed in the area 511a in FIG. 10A of the vehicle seat according to the fourth embodiment of the present invention.

In the example illustrated in FIG. 10A, slits 5141a, 5141b and slits 6141a, 6141b are formed long in the vertical direction (up/down direction) of FIG. 10A. However, as illustrated in FIG. 10B, slits 5141c may be formed long in the horizontal direction (left/right direction) of FIG. 10B, and as illustrated in FIG. 10C, slits 5141d may be formed by alternately combining slits in the vertical direction and slits in the horizontal direction. The same also applies to slits 5141b and slits 6141a, 6141b.

Figure 11:
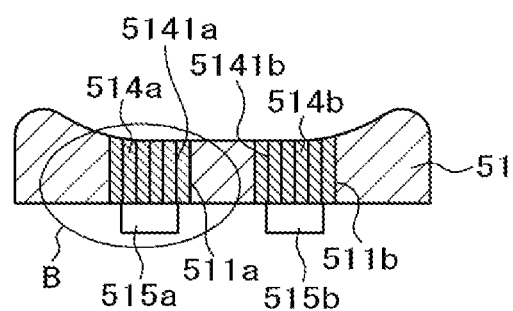
FIG. 11 is a cross section taken along the line A-A in FIG. 10A of the vehicle seat according to the fourth embodiment of the present invention.

FIG. 11 illustrates the cross section taken along the line A-A in the urethane pad 51 on the side of the seat cushion 2 in FIG. 10A. The fiber pads 511a and 511b are formed by extending through the urethane pad 51. The blowers 515a, 515b are provided at portions corresponding to areas 511a and 511b on the back surface (lower side of FIG. 11) of the urethane pad 51. In FIG. 11, members connecting the blowers 515a, 515b and the urethane pad 21 with each other are not shown. As the blowers 515a, 515b, for example, sirocco fans are used.

In the configuration illustrated in FIG. 11, the internal sections of areas 511a and 511b are filled respectively with the fiber pads 514a, 514a integrally molded into the urethane pad 51, and a lot of slits 5141a, 5141b are formed in the fiber pads 514a, 514b.

With such a configuration on the side of the seat cushion 2, when the seated occupant activates the blowers 515a and 515b, the blowers 515a and 515b draw in the air from the side of the fiber pads 514a and 514b where the occupant is seated and discharge from the back surface (lower side of FIG. 11) of the urethane pad 51 to the outside. Consequently, the air is drawn in from the bottom of the thigh of the occupant seated on the seat cushion 2 and from a relatively wide area in the peripheral thereof.

With this configuration, when the occupant is seated, the fiber pads 514a and 514b, which are relatively softer than the urethane pad 51 in the peripheral thereof, deform largely. However, in this embodiment, since the fiber pads 514a and 514b are integrally molded into the urethane pad 51, the fiber pads 514a and 514b are pulled by the urethane pad 51 at the boundary between areas 511a and 511b and the urethane pad 51.

Figure 12:
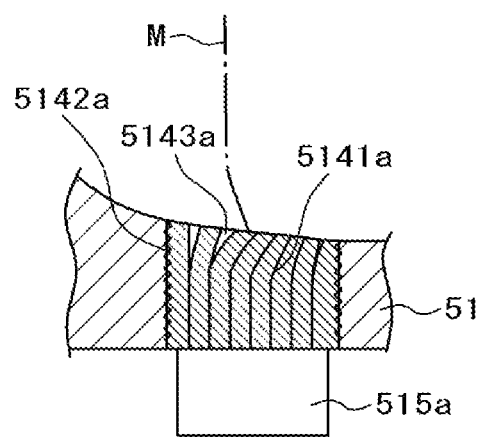
FIG. 12 is an enlarged view of a section B in FIG. 11 of the vehicle seat according to the fourth embodiment of the present invention.

Since a lot of slits 5141a, 5141b are formed in the fiber pads 514a and 514b, the fiber pad 514a close to a boundary 5142a with the urethane pad 51 opens wide to form a space 5143a in the state where the occupant is seated, like an enlarged view of the section B of FIG. 11 illustrated in FIG. 12. Thus, the air passage may be secured. In FIG. 12, outer shape of the thigh of the seated occupant is indicated with M.

In the example illustrated in FIG. 12, the back surface of the urethane pad 51 is supported by a relatively hard and undeformable member. However, this embodiment is not limited thereto. The back surface of the urethane pad 51 may be effectively supported by a relatively soft and deformable material such as, for example, a spring member. In this case, the fiber pads 514a and 514b are pulled at the portion close to the boundary with the urethane pad 51 so as to cause slits close to end portions of the fiber pads to open wide and thereby secure the air passage.

With such a configuration where a lot of slits 5141a, 5141b are formed in the fiber pads 514a and 514b, and the air is drawn in from the bottom of the thigh of the occupant seated on the seat cushion 2 and from a relatively wide area in the peripheral thereof, humidity and heat in a relatively wide area of the seat surface may be reduced, and thereby comfortability of the occupant may be increased. Since the air is drawn in from a relatively wide area, comfortability may be maintained for a relatively long time compared with conventional configurations even when the occupant is seated continuously for a long time.

Further, in the configuration illustrated in FIG. 11, a configuration having the blowers 515a and 515b attached correspondingly to areas 511a and 511b is described. However, the blowers may be shared. In this case, a duct is attached between one blower and areas 511a and 511b, and the air is discharged by the blower from the holes 511a and 511b via the duct.

Although FIG. 11 and FIG. 12 illustrate the configuration of the urethane pad 51 on the side of the seat cushion 2, the urethane pad 61 on the side of the seat back 3 also has a similar cross section configuration. More specifically, the internal sections of areas 611a and 611b extending through the urethane pad 61 are filled with the fiber pads 614a and 614b. In the same manner as illustrated in FIG. 11 and FIG. 12, the blowers (not shown) are attached to the back surface (opposite to the surface where the back of the occupant rests) of areas 611a and 611b of the urethane pad 61.

With such a configuration of the seat back 3, when the occupant seated with the back resting on the seat back activates the blowers attached to the back surface of areas 611a and 611b, the blowers draw in the air from the side of the fiber pads 614a and 614b where the occupant is seated and discharge the air from the back surface of the urethane pad 61 to the outside. Consequently, the air is drawn in from the portion of the seat back 3 where the back of the seated occupant contacts and from a relatively wide area in the peripheral thereof.

Although an example of integrally molding the fiber pads 514a, 514b into areas 511a and 511b is described, a material having the air permeability higher than urethane pads 51 and 61 such as, for example, a permeable material formed by forming a lot of the small holes on an urethane pad, the 3D mesh, the Airweave (registered trade mark) and the Breath-air (registered trade mark) may be used in place of the fiber pads 514a, 514b. The same also applies to a material filled into areas 611a and 611b.

In the above embodiment, the air intake by the blowers from a portion where the back of the occupant seated on the seat back 3 contacts is described. However, on the contrary to this, the air may be blown out from the blowers to the portion where the back of the occupant seated on the seat back 3 contacts.

In the above embodiment, examples of filling areas 511a, 511b, and areas 611a, 611b on both of the seat cushion 2 and the seat back 3 with the fiber pads 514a, 514b, and the fiber pads 614a, 614b are described. However, this may be applied only to any one of the seat cushion 2 and the seat back 3.

In the embodiment described above, the fiber pads 514a, 514b are integrally molded into the urethane pad 51 when the urethane pad is foam-molded. However, areas 511a and 511b may be filled with the fiber pads 514a, 514b after foam-molding of the urethane pad 51, and then the peripheral of the fiber pads 514a, 514b may be fixed to the urethane pad 51 by means of an adhesive.

According to this embodiment, slits formed in the fiber pads 514a, 514b and the fiber pads 614a, 614b allow air to be blown and drawn in from around the thigh of the occupant seated on the vehicle seat 1 and from around the back thereof, and thereby the occupant may feel exhilaration.

Fifth Embodiment

In the fourth embodiment, the fiber pads 514a, 514b are formed respectively in areas 511a, 511b of the urethane pad 51 on the side of the seat cushion 2, and the fiber pads 614a, 614b are formed respectively in areas 611a, 611b of the urethane pad 61 on the side of the seat back 3. In the configuration of this embodiment, in addition to the fiber pads, the grooves extending outward from areas 511a, 511b are formed in an urethane pad 521, and the grooves extending outward from areas 611a, 611b are formed in an urethane pad 631 to allow the air to be sent to or drawn in from wider areas around the thigh and the back of the seated occupant.

Components same as those in the fourth embodiment are assigned with same reference numerals in order to avoid duplicated description.

Figure 13:
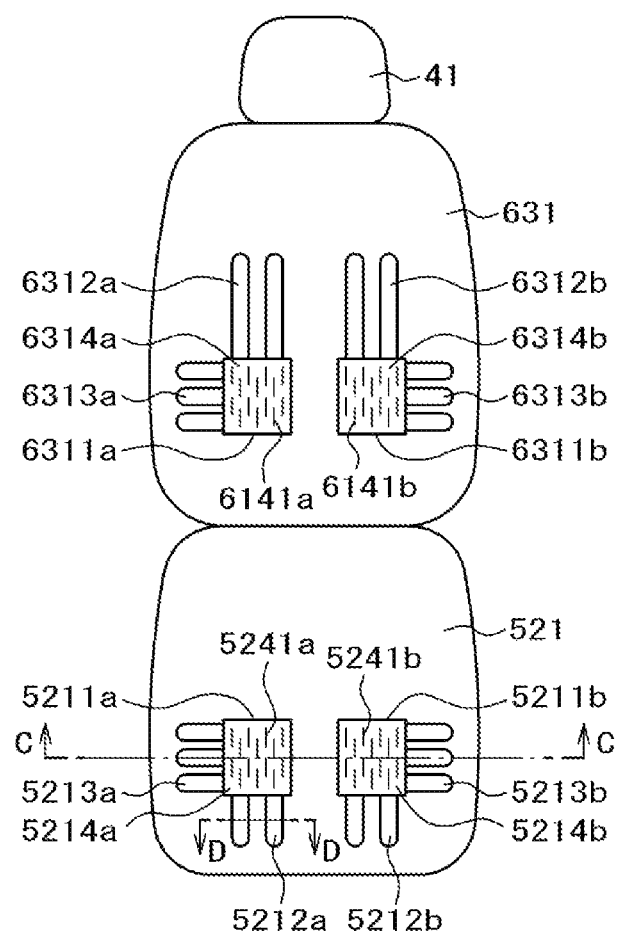
FIG. 13 is a plan view of the vehicle seat with the trim cover covering the vehicle seat removed and the seat back tilted according to a fifth embodiment of the present invention.

FIG. 13 is a plan view of the vehicle sheet 1 according to this embodiment with the trim cover covering the surface of the vehicle seat 1 illustrated in FIG. 1 removed to expose the urethane pad and the seat back 3 tilted.

In the configuration illustrated in FIG. 3, an urethane pad 521 includes, in addition to the vehicle sheet 1 according to the fourth embodiment illustrated in FIG. 10A, the grooves 5212a, 5212b formed by extending in the front direction (in the direction of the knee) of the seated occupant from areas 5211a and 5211b into which the fiber pads 5241a are integrally molded, and the grooves 5213a, 5213b formed by extending in the lateral direction (outward) into which the fiber pads 5241b are integrally molded into the urethane pad

521. The internal sections of the grooves 5212a, 5212b, and the grooves 5213a, 5213b are not filled with the fiber pads 5214a, 5214b and have a cavity respectively.

The grooves 6313a, 6313b are formed by extending to above the back of the seated occupant from areas 6311a and 6311b filled with the fiber pads 6314a, 6314b in the urethane pad 631. The internal sections of the grooves 6313a, 6312b, and the grooves 6313a, 6313b have the cavity respectively.

Figure 14:
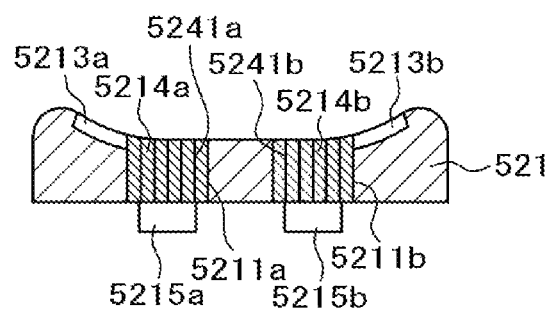
FIG. 14 is a cross section taken along the line C-C in FIG. 13 of the vehicle seat according to the fifth embodiment of the present invention.

FIG. 14 illustrates the cross section taken along the line C-C of FIG. 13. Areas 5211a and 5211b are filled with the fiber pads 5214a, 5214b respectively, and the internal sections of the grooves 5213a, 5213b have the cavity respectively.

In the meantime, a whole or part of the grooves 5212a, 5212b, 5213a, 5213b of the urethane pad 521 on the side of the seat cushion 2, and the grooves 6312a, 6312b 6313a, 6313b of the urethane pad 631 on the side of the seat back 3 may be filled with the fiber pads of a material same as the fiber pads 5214a, 5214b.

Figure 15:
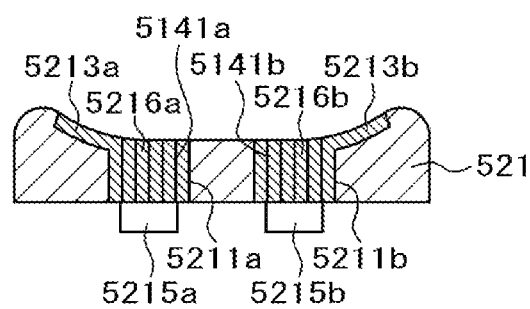
FIG. 15 is a cross section of the groove in a state that a internal section thereof is filled with the fiber pads, the groove corresponding to the cross section taken along the line C-C in FIG. 13 of the vehicle seat according to the fifth embodiment of the present invention.
Figure 16:
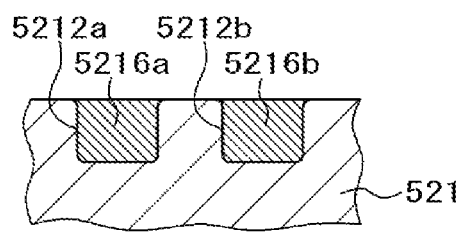
FIG. 16 is a cross section indicating a state of the groove with the internal section thereof filed with the fiber pads, the groove corresponding to the cross section taken along the line D-D in FIG. 13 of the vehicle seat according to the fifth embodiment of the present invention.

As an example, FIG. 15 illustrates a state where the internal sections of the grooves 5213a and 5213b in the cross section taken along the line C-C of FIG. 13 same as FIG. 14 are filled respectively with the fiber pads 5216a, 5216b in the same manner as the internal sections of areas 5211a and 5211b. The grooves 5213a, 5213b formed on the urethane pad 521 on the side of the seat cushion 2 illustrated in FIG. 15 have the same cross section shape in the cross section at a right angle relative to the longitudinal direction of the grooves. As an example, FIG. 16 illustrates the cross section shape of grooves 5212a, 5212b in the cross section taken along the line D-D of FIG. 13. Grooves 5212a, 5212b has a rectangular cross section shape.

The groove of such the rectangular cross section shape may cause the occupant seated on the seat cushion 2 to feel the recess of the groove and subsequent deterioration of seating comfort.

In the meantime, in the example illustrated in FIG. 17 to FIG. 19, the opening dimension of the groove on the surface where the occupant is seated is formed so as to be smaller than the dimension of the portion below therefrom. More specifically, the opening dimension of the opening of the groove under no load is set such that the occupant seated on the seat cushion 2 does not feel the recess of the groove, and thereby deterioration of the seating comfort for the seated occupant due to the recess may be prevented.

Figure 17:
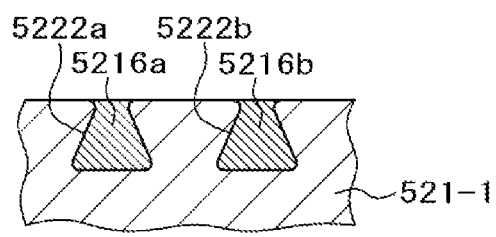
FIG. 17 is a cross section indicating a modified example of the groove with the internal section thereof filled with the fiber pads, the groove corresponding to the cross section taken along the line D-D in FIG. 13 of the vehicle seat according to the fifth embodiment of the present invention.

FIG. 17 illustrates the grooves 5222a, 5222b each having the cross section of a substantially trapezoidal shape. In FIG. 17, the grooves 5222a, 5222b formed on the urethane pad 521-1 have the substantially trapezoidal shape with the bottom surface larger than the opening on the upper side. The grooves 5222a, 5222b have the cross section shape in which the opening is narrower than the internal space of the grooves 5222a, 5222b formed inside the urethane pad 521-1. The internal spaces of the grooves 5222a, 5222b are filled with the fiber pads 5216a, 5216b.

When the occupant is seated on the seat cushion, the flexible urethane pad 521-1 compressed by weight of the occupant deforms and subsequently, the grooves 5222a, 5222b also deform. The grooves 5222a, 5222b are shaped such that the upper section (opening) is narrower than the bottom section thereof and formed such that thickness in the cross section gradually decreases toward the upper section. Thus, when weight of the occupant is applied, the grooves 5222a, 5222b are deformable largely in a direction where width of the opening becomes narrower, and thereby reduces dimension of the opening. In the meantime, the dimension of the bottom section of the grooves 5222a, 5222b does not almost change from a dimension before the occupant is seated. As a result, the space of the air passage may be secured in the grooves 5222a, 5222b even when a load is applied, and thereby the air may be supplied to and discharged from the tip portion of the grooves 5222a, 5222b.

On the other hand, when weight of the occupant is applied, openings of the grooves 5222a, 522b deform in a direction where the opening dimension (width) becomes smaller. However, the opening dimension of the opening under no load may be set such that the opening dimension of the deformed opening does not cause the seated occupant to feel the recess, and thereby deterioration of the seating comfort for the seated occupant due to the recess may be prevented.

Figure 18:
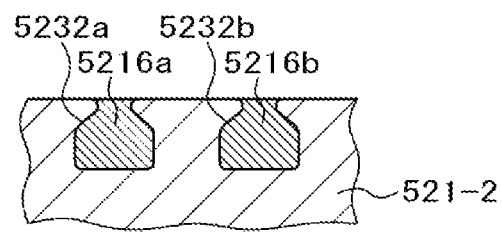
FIG. 18 is a cross section indicating another modified example of the groove with the internal section thereof filled with the fiber pads, the groove corresponding to the cross section taken along the line D-D in FIG. 13 of the vehicle seat according to the fifth embodiment of the present invention.

FIG. 18 illustrates an example of the grooves 5232a, 5232b each having the cross section shape modified from FIG. 17. The cross section shape of the grooves 5232a, 5232b formed on the urethane pad 521-2 illustrated in FIG. 18 includes an opening formed at a center of an upper section of the rectangular shape as a result that thickness gradually decreases from both sides. More specifically, the opening formed at the upper section of the grooves 5232a, 5232b has the cross section shape narrower than the space section of the grooves 5232a, 5232b formed inside the urethane pad 521-2.

When the occupant is seated on the seat cushion 2, the grooves 5232a, 5232b of such shape deform largely in a direction where width of the opening formed at the upper section of the grooves 5232a, 5232b becomes smaller, while dimension of the bottom section of the grooves 5232a, 5232b does not almost change compared with a non-load state where the occupant is not seated. As a result, the space of the air passage may be secured in the grooves 5232a, 5232b even in a state where the occupant is seated, and thereby the air may be supplied to or discharged from the tip portion of the grooves 5232a, 5232b. The fiber pads 5216a, 5216b are filled respectively into the inner spaces of the grooves 5222a, 5222b.

On the other hand, when a load is applied, the opening formed at the upper section of each of the grooves 5232a, 5232b deforms in a direction where the opening dimension (width) becomes smaller. However, the opening dimension of the opening under no load may be set such that the opening dimension of the deformed opening does not cause the seated occupant to feel the recess, and thereby deterioration of the seating comfort for the seated occupant due to the recess may be prevented.

Figure 19:
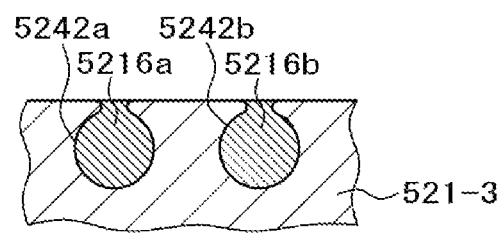
FIG. 19 is a cross section indicating a further another modified example of the groove with the internal section thereof filled with the fiber pads, the groove corresponding to the cross section taken along the line D-D in FIG. 13 of the vehicle seat according to the fifth embodiment of the present invention.

FIG. 19 illustrates an example of the grooves 5242a, 5242b each having the cross section shape modified from FIG. 17. The cross section shape of the groove 5242a illustrated in FIG. 19 includes an opening formed at a center of the upper portion of a circular cross section as a result that thickness gradually decreases from both sides. More specifically, each of the grooves 5242a, 5242b has the cross section shape in which the opening formed at the upper section thereof is narrower than a widest portion of the internal space of the grooves 5242a, 5242b inside the urethane pad 521-3.

When the occupant is seated on the seat cushion 2, the grooves 5242a, 5242b illustrated in FIG. 19 also deform largely in a direction where width of the opening becomes smaller, while dimension of the bottom section of each of the grooves 5242a, 5242b does not almost change compared with a non-load state where the occupant is not seated on the seat cushion 2. As a result, the space of the air passage may be secured in the grooves 5242a, 5242b even in a state where load is applied with the occupant seated on the seat cushion 2, and thereby the air may be supplied to or discharged from the tip portion of each of the grooves 5242a, 5242b. The internal spaces of the grooves 5242a, 5242b are filled with the fiber pads 5216a, 5216b.

On the other hand, when a load is applied, the opening formed at the upper section of each of the grooves 5242a, 5242b deforms in a direction where the opening dimension (width) becomes smaller. However, the opening dimension of the opening under no load may be set such that the opening dimension of the deformed opening does not cause the seated occupant to feel the recess, and thereby deterioration of the seating comfort for the seated occupant due to the recess may be prevented.

According to this embodiment, for example, in the configuration illustrated in FIG. 17, the cross section of each of the grooves 5222a, 5222b formed on the urethane pad 521-1 is shaped such that thickness of the cross section of the opening provided at the upper section of the grooves 5222a, 5222b on the side where the occupant is seated gradually decreases from the outer side toward the center of the opening. This allows the air to be drawn in from the bottom of the thigh of the occupant seated on the seat cushion 2 and from a relatively wide area in the peripheral thereof. Such configuration may reduce humidity and heat in a relatively wide area of the seat surface and thereby increase comfortability of the occupant. Since the air is drawn in from a relatively wide area, comfortability may be maintained for a relatively long time compared with conventional configurations even when the occupant is seated continuously for a long time.

Extent of deformation of the grooves 5222a, 5222b, 5232a, 5232b or the grooves 5242a, 5242b depends on the load or weight of the seated occupant and the seated position. In a portion where a big load is applied, the grooves 5222a, 5222b, 5232a, 5232b or 5242a, 5242b deform largely and thereby reduce width of openings. In a portion where a small load is applied, the grooves 5222a, 5222b, 5232a, 5232b or 5242a, 5242b deform slightly and do not so much reduce the opening dimension of respective openings. This causes a distribution of the air amount blown or drawn in through respective openings. As a result, a portion where a big load is applied has less amount of the air blown out or drawn in through the openings, while a portion where a load is relatively small has more amount of the air blown out or drawn in through the openings.

Thus, increase of air blown out or drawn in through openings at a portion where a load is relatively small increases the sensation of coolness of the seated occupant and improves physical feeling.

Also, the air passage is secured as described above even at a portion where cross sections of the grooves 5222a, 5222b, 5232a, 5232b or the grooves 5242a, 5242b deform largely due to a big load applied. Thus, the air sent from the blower 5215a or 5215b may be passed across the grooves 5222a, 5222b, 5232a, 5232b or the grooves 5242a, 5242b without a significant resistance. Also, the air drawn in by the blower 5215a or 5215b from the grooves 5222a, 5222b, 5232a, 5232b or the grooves 5242a, 5242b may be drawn in without a significant resistance. Therefore, even if axial fans are used as the blowers 5215a and 5215b in place of sirocco fans, sufficient air quantity may be secured across the grooves 5222a, 5222b, 5232a, 5232b or the grooves 5242a, 5242b.

In this embodiment, the internal spaces of the grooves 5222a, 5222b, 5232a, 5232b or the grooves 5242a, 5242b are filled with the fiber pads 5216a, 5216b. However, as described with reference to FIG. 13 and FIG. 14, this embodiment may also be applied to a case where the internal spaces of the grooves 5222a, 5222b, 5232a, 5232b or the grooves 5242a, 5242b are not filled with the fiber pads 5216a, 5216b.

Although configurations illustrated in FIG. 13 to FIG. 15 include the blowers 5215a, 5215b, the air permeability may be maintained by the grooves 5222a, 5222b, 5232a, 5232b or the grooves 5242a, 5242b without provision of the blowers 5215a, 5215b. Thus, effects of this embodiment may be obtained.

Sixth Embodiment

In the fourth embodiment and the fifth embodiment, areas 5211a, 5211b of the urethane pad 51 or 521 on the side of the seat cushion 2 and areas 6311a, 6311b of the urethane pad 61 or 631 on the side of the seat back 3 are filled with the fiber pads 5214a, 5214b, 6314a, 6314b. In this embodiment, the fiber pads 5214a, 5214b, 6314a, 6314b are not used.

Figure 20:
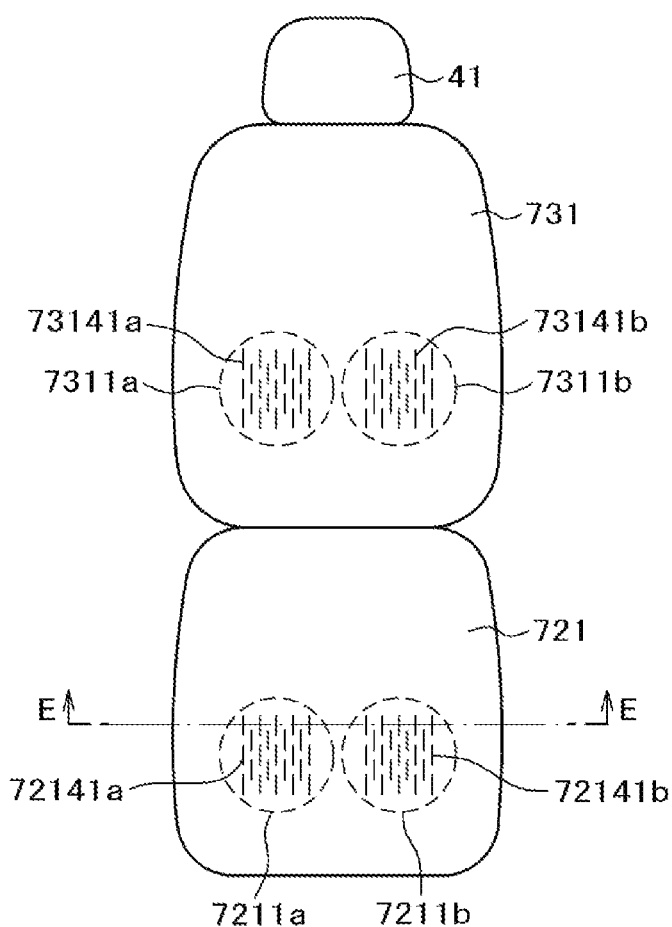
FIG. 20 is a plan view of the vehicle seat with the trim cover covering a surface of vehicle seat removed and the seat back tilted according to a sixth embodiment of the present invention.

FIG. 20 is a plan view of the vehicle seat 1 according to this embodiment with the trim cover covering a surface of the vehicle seat 1 removed to expose the urethane pad.

The urethane pad 721 on the side of the seat cushion includes a lot of slits 72141a and 72141b formed at portions 7211a and 7211b where the thigh of the seated occupant contacts.

The urethane pad 731 on the side of the seat back includes a lot of slits 73141a, 73141b formed at portions 7311a and 7311b where the back of the seated occupant contacts.

Figure 21:
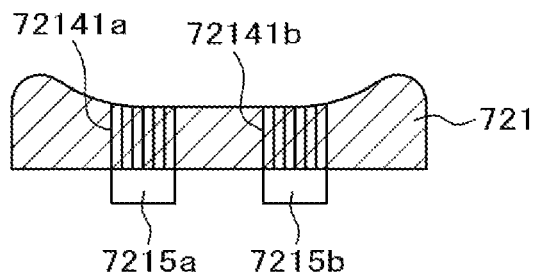
FIG. 21 is a cross section taken along the line E-E in FIG. 20 of the vehicle seat according to the sixth embodiment of the present invention.

FIG. 21 illustrates a cross section taken along the line E-E of FIG. 20. Slits 72141a, 72141b are formed by extending through the urethane pad 721 from the surface of the urethane pad 721 where the occupant is seated to a back surface where the blowers 7215a, 7215b are provided.

When the occupant is seated, the depressed urethane pad 721 deforms. Then, as illustrated in FIG. 20, slits 72141a, 72141b open wide in the vicinity of the boundary area between the portion where the urethane pad 721 is depressed and the portion where the urethane pad 721 is not depressed at a location slightly apart from the portion where the occupant is seated, and thereby the air passage may be secured.

Although in the example illustrated in FIG. 20, the back surface of the urethane pad 721 is supported by a relatively hard and undeformable member, this embodiment is not limited thereto. The back surface of the urethane pad 721 may be effectively supported by a relatively soft and deformable material such as, for example, a spring material. In this case, slits 72141a, 72141b open wide in the vicinity of the boundary area between the portion where the urethane pad 721 is depressed and the portion where the urethane pad 721 is not depressed at a location slightly apart from the portion where the occupant is seated, and thereby the air passage may be secured.

With such a configuration where a lot of slits 72141a, 72141b are formed on the urethane pad 721, and the air is drawn in from the bottom of the thigh of the occupant seated on the seat cushion 2 and from a relatively wide area in the peripheral thereof in a reliable manner, humidity and heat in a relatively wide area of the seat surface may be reduced, and thereby comfortability of the occupant may be increased. Since air is drawn in from a relatively wide area, comfortability may be maintained for a relatively long time compared with conventional configurations even when the occupant is seated continuously for a long time.

The same effects also may be expected from a lot of slits 73141a and 73141b formed on the urethane pad 731 on the side of the seat back. The configuration of drawing in the air from the back of the occupant seated with the back resting on the seat back 3 and from a relatively wide area in the peripheral thereof allows to reduce humidity and heat of the seat surface and thereby increases comfortability of the occupant.

The invention by the present inventors is specifically described based on the embodiments as above. However, the present invention is not limited to the above embodiments, and it is obvious that the present invention may be modified in various ways within a scope not deviating therefrom. More specifically, the present invention includes a means which includes a function equivalent to part of a configuration described in the above embodiments or a means which omits part of an insufficient function from any of the embodiments shall be included in the present invention.

REFERENCE SIGNS LIST

1: vehicle seat, 2: seat cushion, 3: seat back, 4: head rest, 21, 21-1, 21-2, 21-3, 31, 51, 61, 521, 631, 721, 731: urethane pad, 211a, 211b, 311a, 311b: hole, 212a, 212b, 213b, 222, 232, 242, 312a, 312b, 313a, 313b, 5212a, 5212b, 5213a, 5213b, 5222a, 5232a, 5242a, 6312b, 6313a, 6313b: groove, 214a, 214b, 216, 216a, 216b, 514a, 514b, 5216a, 5216b, 614a, 614b, 6314a, 6314b: fiber pad, 511a, 511b, 611a, 611b, 5211a, 5211b, 6311a, 6311b: area, 5141a, 5141b, 5241a, 5241b, 6141a, 6141b, 72141a, 72141b, 73141a, 73141b: slit

The invention claimed is:

1. A vehicle seat including a seat cushion, a seat back, and a head rest, wherein
    each of the seat cushion and the seat back includes a urethane pad,
    in each urethane pad a pair of holes is formed, each of the pair holes extending from a surface of the urethane pad where an occupant is seated to a back surface of the urethane pad opposite to the surface of the urethane pad where the occupant is seated,
    each of the pair of holes is filled with a material having an air permeability higher than the urethane pad from the surface of the urethane pad where the occupant is seated to the back surface of the urethane pad opposite to the surface where the occupant is seated,
    a respective plurality of grooves extending from each of the pair of holes are formed on the surface of the urethane pad where the occupant is seated,
    a respective blower is provided for each of the pair of holes on the back surface of each urethane pad which is opposite to the surface where the occupant is seated, each blower being configured to discharge or draw in air from the surface of the urethane pad where the occupant is seated via the corresponding hole filled with the material having the air permeability higher than the urethane pad,
    the pair of holes formed in the urethane pad of the seat cushion are formed at locations corresponding to contact positions of the thighs of the occupant,
    the material filled in each of the pair of holes is selected from a group consisting of a fiber pad, a permeable material formed by forming a plurality of holes in the urethane pad, a 3D mesh, Airweave, and Breathair, or a combination of those materials, and
    each of the plurality of grooves has an opening on the surface of the urethane pad where the occupant is seated, in a cross section at a right angle relative to a longitudinal direction of the groove, and a width of the groove below the opening is larger than a width of the opening.

2. The vehicle seat according to claim 1, wherein the internal section of each of the grooves is filled with a material which is same as the material filled into each of the pair of holes.

3. A vehicle seat comprising a seat cushion, a seat back, and a head rest, wherein
    each of the seat cushion and the seat back includes a urethane pad,
    in at least the urethane pad of the seat cushion, a pair of holes is formed, each of the pair of holes extending from a surface of the urethane pad where an occupant is seated to a back surface of the urethane pad opposite to the surface of the urethane pad where the occupant is seated,
    an internal section of each of the pair of holes formed in the urethane pad is filled with a material having an air permeability higher than the urethane pad from the surface where the occupant is seated to the back surface opposite to the surface where the occupant is seated,
    a respective groove extending from each of the pair of holes and having an opening on the surface of the urethane pad is formed in the urethane pad where the occupant is seated, and, in a cross section of the groove in a right angle relative to a direction in which the groove extends, a width of an internal section of the groove inside the urethane pad is larger than a width of the opening,
    a respective blower is provided for each of the pair of holes on the back surface of the urethane pad which is opposite to the surface where the occupant is seated, and
    the pair of holes formed in the urethane pad of the seat cushion are formed at locations corresponding to contact positions of the thighs of the occupant.

4. The vehicle seat according to claim 3, wherein the material filled in each of the pair of holes is selected from the group consisting of a fiber pad, a permeable material formed by forming a plurality of holes in the urethane pad, a 3D mesh, Airweave, and Breathair, or a combination of those materials.

5. The vehicle seat according to claim 3, wherein the internal section of the groove is filled with a material which is the same as the material filled into each of the pair of holes.

* * * * *